United States Patent
Cech et al.

(10) Patent No.: US 7,499,219 B2
(45) Date of Patent: Mar. 3, 2009

(54) OPTIMIZED LENS FOR INDIRECT OPHTHALMOSCOPY

(75) Inventors: Steven D. Cech, Aurora, OH (US); Timothy D. Edwards, Cleveland, OH (US); Sean P. McGinnis, Chesterland, OH (US)

(73) Assignee: Volk Optical, Inc., Mentor, OH (US)

( * ) Notice: Subject to any disclaimer, the term of this patent is extended or adjusted under 35 U.S.C. 154(b) by 122 days.

(21) Appl. No.: 11/391,922

(22) Filed: Mar. 28, 2006

(65) Prior Publication Data

US 2007/0091256 A1 Apr. 26, 2007

Related U.S. Application Data

(60) Provisional application No. 60/726,857, filed on Oct. 14, 2005.

(51) Int. Cl.
*G02B 3/00* (2006.01)
*G02B 7/02* (2006.01)

(52) U.S. Cl. ........................ 359/642; 359/808

(58) Field of Classification Search .................. 351/205, 351/211, 159; 359/643, 708, 808
See application file for complete search history.

(56) References Cited

U.S. PATENT DOCUMENTS

| | | | |
|---|---|---|---|
| 3,898,093 A * | 8/1975 | Faulstich et al. | 501/64 |
| 4,084,978 A * | 4/1978 | Sagara | 501/63 |
| 5,745,212 A | 4/1998 | Volk | |
| 5,757,464 A | 5/1998 | Volk | |
| 5,784,147 A | 7/1998 | Volk | |
| 5,805,269 A | 9/1998 | Volk | |
| 5,857,475 A | 1/1999 | Volk | |
| 5,886,812 A | 3/1999 | Volk | |
| 5,963,301 A | 10/1999 | Volk | |
| 6,121,176 A * | 9/2000 | Comte | 501/78 |
| D434,498 S | 11/2000 | Mueller et al. | |
| D434,851 S | 12/2000 | Mueller et al. | |
| 6,164,779 A | 12/2000 | Volk | |
| D438,621 S | 3/2001 | Mueller et al. | |
| RE37,298 E | 7/2001 | Volk | |
| 6,255,240 B1 * | 7/2001 | Comte et al. | 501/78 |
| 6,912,093 B2 * | 6/2005 | Endo | 359/642 |
| 7,138,349 B2 * | 11/2006 | Uehara et al. | 501/78 |
| 2006/0244914 A1 | 11/2006 | Cech et al. | |

* cited by examiner

*Primary Examiner*—Darryl J Collins
(74) *Attorney, Agent, or Firm*—Dinsmore & Shohl LLP (57) ABSTRACT

An autoclavable diagnostic ophthalmic lens system includes a biconvex lens element having front and rear surfaces and a housing in which the biconvex lens element is mounted. The biconvex lens element is fabricated from a glass having an index-of-refraction greater of 1.7 or greater. The glass composition meets the following parameters:

(% $SiO_2$ (by weight)+% $B_2O_3$) is less than 50%;

% of alkali metal compounds+% of alkaline earth metal compounds is less than 10%; and (% $SiO_2$+% $B_2O_3$)/(% rare earth compounds) is less than 1.

18 Claims, 6 Drawing Sheets

OPTIMIZED LENS FOR INDIRECT OPHTHALMOSCOPY

This application claims the benefit of U.S. Provisional Application No. 60/726,857, filed Oct. 14, 2005, which is hereby incorporated herein by reference.

FIELD OF THE INVENTION

The present invention is directed to diagnostic ophthalmic lenses, particularly indirect ophthalmoscopy lens systems having at least one lens element made from glass compositions which not only provide improved performance but also can be sterilized in an autoclave without experiencing optical degradation.

BACKGROUND OF THE INVENTION

It is well known in the art to use suitably engineered and prepared diagnostic ophthalmic lenses to provide an indirect image of the retina of a patient under examination. By properly placing a diagnostic ophthalmic lens a suitable distance from the cornea of an eye, an indirect image of the retinal surface is formed external to the eye structure. The indirect image of the curved retinal surface is typically formed in a generally flat image plane wherein it is available for convenient observation using an ophthalmoscope.

U.S. Pat. No. 4,738,521 (which is incorporated herein by way of reference) describes exemplary diagnostic ophthalmic lenses designed for use in conjunction with indirect ophthalmoscopes. This patent describes an indirect ophthalmic lens for use in examining a patient's eye comprising a homogeneous transparent optical material having two aspheric surfaces of revolution. The optical material used to form the dual aspheric lens is described as being either a glass having an index-of-refraction of 1.523 or, alternatively, an ophthalmic plastic having an index-of-refraction of 1.498. The attributes of a lens fabricated as defined in this patent allow a generally flat indirect image of the retina-under-exam to be formed free of any significant image aberrations.

Diagnostic ophthalmic lens systems such as that described in the above patent are used for both illumination and imaging purposes (as further discussed herein). As a result, however, specular surface reflections can reduce the performance of the lens system.

Diagnostic ophthalmic lens systems also must be sterilized. For example, it is common to use diagnostic ophthalmic lenses in conjunction with an indirect ophthalmoscope within an operating room environment during surgery on the eye. Because the surgeon touches the diagnostic ophthalmic lens during the course of surgery and then goes on to perform other procedures and operations within the sterile surgical field, it is necessary for the diagnostic ophthalmic lens to be properly sterilized prior to each and every surgical use. One method of effecting adequate sterilization of medical devices is through the use of a steam autoclave. In a steam autoclave, vapor under high temperature and pressure is used to effectively sterilize the surfaces of the item. However, the harsh environment of a steam autoclave will often have a deleterious effect on the optical and structural properties of standard optical glasses.

SUMMARY OF THE INVENTION

One embodiment of the present invention provides an autoclavable diagnostic ophthalmic lens system comprising a biconvex lens element fabricated from a glass having an index-of-refraction of 1.7 or greater. The glass composition meets the following parameters:

(% $SiO_2$ (by weight)+% $B_2O_3$) is less than 50%;
% of alkali metal compounds+% of alkaline earth metal compounds is less than 10%; and
(% $SiO_2$+% $B_2O_3$)/(% rare earth compounds) is less than 1.

The lens system further comprises a housing in which the biconvex lens element is mounted, and the optical power of the biconvex lens element is between about 10 and about 40 diopters.

The front and rear surfaces of the biconvex lens element may both be aspheric or spherical. Alternatively, one surface may be aspheric and the other surface spherical. The housing may include a tactile (non-smooth) surface on at least a portion of its exterior in order to facilitate gripping of the housing during use. The tactile surface may comprise a knurled surface.

In another embodiment, the biconvex lens element is fabricated from a glass having an index-of-refraction greater than 1.8, wherein the glass meets the following compositional parameters:

% $SiO_2$ (by weight)+% $B_2O_3$ is less than 30% of the total weight of the composition;
the sum of the % of alkali metal compounds and the % of alkaline earth metal compounds is less than 5% of the total weight of the composition; and
(% $SiO_2$+% $B_2O_3$)/(% rare earth compounds) is less than 0.7.

In a particular embodiment, the index-of-refraction of the glass is greater than 1.8, and the glass comprises:

| | |
|---|---|
| $SiO_2$ | <10% |
| $B_2O_3$ | 10-20% |
| $La_2O_3$ | 40-50% |
| $Gd_2O_3$ | 10-20% |
| $Ta_2O_5$ | 10-20% |
| $Nb_2O_5$ | <10% |
| $ZrO_2$ | <10% |
| $Sb_2O_3$ | <1% |
| BaO | <1% |
| $WO_3$ | <1% |
| $Yb_2O_3$ | <10% |

In yet another particular embodiment, the index-of-refraction of the glass is greater than 1.8, and the glass comprises:

| | |
|---|---|
| $SiO_2$ | 3-8% |
| $B_2O_3$ | 5-15% |
| $La_2O_3$ | 25-35% |
| $Gd_2O_3$ | 25-35% |
| $Ta_2O_5$ | 15-25% |
| $Nb_2O_5$ | <2% |
| $ZrO_2$ | 3-8% |
| $Sb_2O_3$ | <0.5% |
| $SnO_2$ | <1% |

BRIEF DESCRIPTION OF THE DRAWINGS

The following detailed description will be more fully understood in view of the drawing in which.

The embodiments set forth in the drawings are illustrative in nature and are not intended to be limiting of the invention defined by the claims. Moreover, individual features of the drawing and the invention will be more fully apparent and understood in view of the detailed description.

DETAILED DESCRIPTION

The present invention is directed to diagnostic ophthalmic lens systems which may be used in conjunction with an indirect ophthalmoscope, particularly in the surgical arena or in other applications in which autoclave sterilization is required between uses. The lens systems of the present invention may be used to form an inverted real aerial image of the retina. The diagnostic ophthalmic lens systems of the present invention include a lens element fabricated from a glass composition which results in a reduction of the effects of deleterious back-reflected light from a ophthalmoscope light source (i.e., specular surface reflections). At the same time, the glass composition is compatible with the environment of a steam autoclave.

In particular, applicants have discovered that low diopter (10-40 diopters) diagnostic ophthalmic lens systems comprising a biconvex lens element made from certain glass compositions having an index-of-refraction of 1.7 or greater will significantly reduce the effects of specular surface reflections as compared to lens elements made from glass having a lower index-of-refraction. At the same time, these glass compositions may be steam autoclaved without degradation of the glass. As used herein, the term "autoclavable" means that the lens element can be repeatedly steam sterilized (20 times or more using tap water having about 300 ppm total dissolved solids in an autoclave) at temperatures of at least about 275° F. without exhibiting damage which adversely affects the performance of the lens. The lens systems of the present invention may have an optical power of between about 10 and about 40 diopters.

In the past, low optical power indirect ophthalmoscopy lens systems have not used glass compositions having an index-of-refraction of 1.7 or greater since such materials are much more expensive than lower index glass. Although the use of lower index glass results in lens elements having greater curvature, the increased curvature is generally not an issue for low optical power lens systems. However, applicants have discovered that these lens systems may be fabricated from certain high index glass compositions which not only significantly reduce the effects of specular surface reflections, but also can be repeatedly autoclaved. The low index glass materials typically used in these lens systems cannot be autoclaved since the glass will deteriorate such that the lens system becomes unusable.

Figure 1:
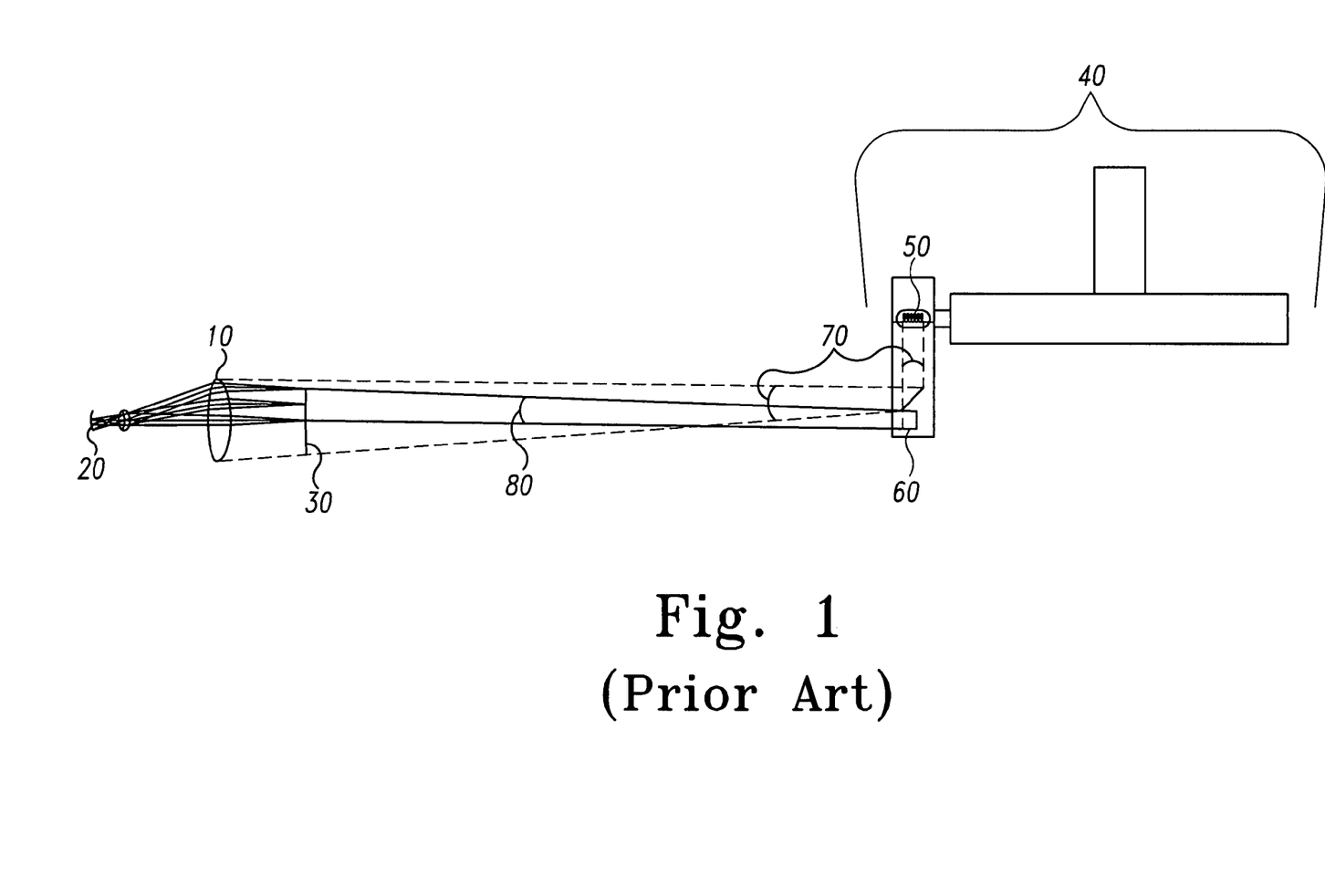
FIG. 1 depicts the use of a prior art diagnostic ophthalmic lens system in conjunction with a head-mounted indirect ophthalmoscope.

FIG. 1 depicts the use of a prior art lens design with an ophthalmoscope to form an indirect image of a retina. In FIG. 1, a diagnostic ophthalmic lens 10 is located at a distance from an eye-under-exam. The lens 10 receives reflected light rays from all points along the surface of the retina 20 and forms an inverted and magnified indirect image 30 of the retinal surface in a region external to the eye. After forming the indirect image 30, the imaged light rays proceed towards an indirect ophthalmoscope 40 along an imaging path 80. At the indirect ophthalmoscope 40, the light rays that have followed along the imaging path 80 are received by the objective lens 60 of the indirect ophthalmoscope 40 which acts, in turn, to make the retinal image 30 viewable by the doctor.

Ophthalmoscope 40 also includes a lamp 50 having an associated illumination path 70. Lamp 50 acts as a source of illumination which highlights the surface of the retina 20 in order to form the indirect, real retinal image 30. Light emitted from lamp 50 travels along the illumination path 70 until it strikes the surface of the diagnostic ophthalmic lens 10. At this point, the diagnostic ophthalmic lens focuses the light through the pupil of the eye, through the eye lens 21, and onto the retinal surface 20.

One problem with existing diagnostic ophthalmic lenses 10 is directly related to their dual imaging/illumination functions. When an intense lamp filament or other source of illumination is made incident to the surface of a generally transmissive polished optical surface, a percentage of the incident light rays or flux reflects off the surface of the substrate. Instead of transmitting through or past, a portion of the incident flux reflects as if the surface was a mirror. This phenomenon is commonly observed in nature, as witnessed by the reflections of the sun off the surface of a pool or a lake. This tendency for a portion of the incident flux to reflect happens to some degree independent of whether or not the surface includes an anti-reflection (AR) optical coating. AR coatings of this type are well known in the art and do indeed act to minimize the magnitude of these specular reflections. However, coatings of this type do not eliminate specular reflections entirely, thereby leaving AR-coated lenses still susceptible to specular surface reflections when these lenses are used for both illumination and imaging purposes.

In the case of diagnostic ophthalmic lens 10 in FIG. 1, these direct specular reflections from both the front and back surfaces of the lens add deleterious artifacts that tend to mask important details of the retinal image 30 as it is viewed through the ophthalmoscope 40. Applicant has discovered that specific engineered changes to the form and/or composition of the diagnostic ophthalmic lens 10 can reduce the tendency of the lens to form such deleterious specular reflections and, in doing so, improve its overall performance.

In particular, certain glass compositions having an index-of-refraction of 1.7 or greater allow for the formation of a lens having a particular focal length using less curved surfaces as compared to a glass fabricated out of a lower index material. In addition, these glass compositions are autoclavable.

The optical power of a spherical lens surface at a lens-to-air interface is given by the relationship Optical Power=$(n-1)/r$, wherein n is the index-of-refraction, and r is the radius of curvature of the lens surface. Assuming two different optical materials, one with an index-of-refraction of 1.5 and another with an index-of-refraction of 1.8, and a goal of achieving the same optical power in both, the above equation dictates that the material having the higher index-of-refraction would need to be formed with a radius of curvature of 1.6 times that of the lower index material in order to provide the same optical power. In other words, the higher index-of-refraction material results in a flatter lens surface. The benefits of using a flatter lens surface such as this to construct a diagnostic ophthalmic lens is illustrated in FIGS. 2-5.

Figure 2:
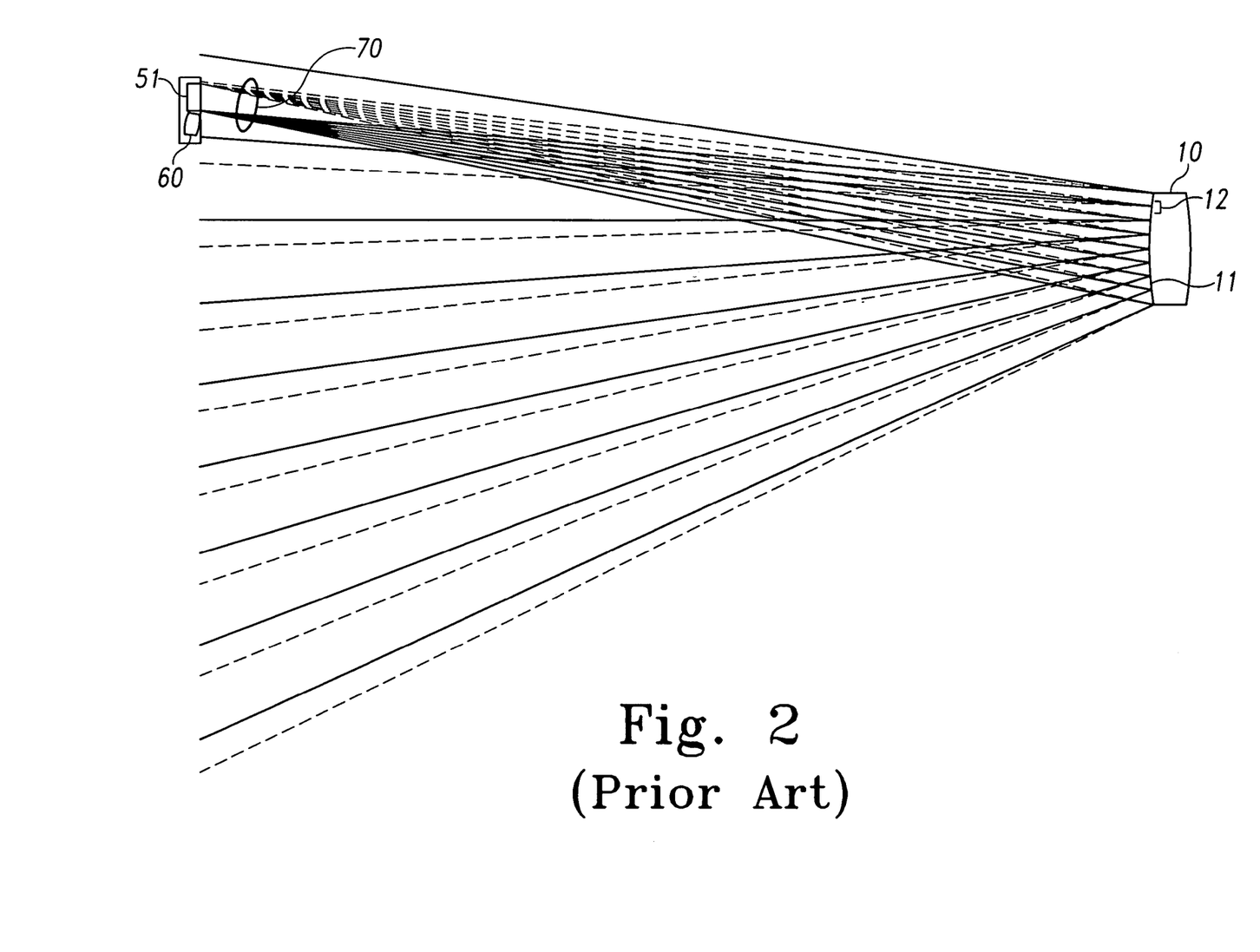
FIGS. 2 and 4 depict the formation of a deleterious specular reflection artifacts off the surfaces of the highly curved diagnostic ophthalmic lens system of FIG. 1.

FIG. 2 provides an illustrative example of the specular reflections that can occur off of the front surface of a prior art diagnostic ophthalmic lens 10 made from a glass composition having an index-of-refraction of 1.5. For simplicity, in FIG. 2 the integral ophthalmoscope lamp is represented by the extended illumination source 51. The extended illumination source 51 is located in close physical proximity to the ophthalmoscope objective lens 60. Illumination rays emanating from the extended illumination source 51 travel along an illumination path 70 until they reach the front surface 11 of the diagnostic ophthalmic lens 10. At this surface, a portion of the incident flux reflects off the polished front surface 11 as if it were a mirror. The reflected rays travel back in the general direction of the ophthalmoscope objective 60 and, as indicated by the reflected ray bundle spanning from well below the objective 60 to somewhat above, a portion of rays enter directly into the objective. In this specific example the radius of curvature of the front surface 11 of the lens 10 is 80 mm. At this surface radius and with the general illumination and viewing geometry depicted in FIG. 2, the extended illumination source 51 would specularly reflect back into the ophthalmoscope objective 60 along the specular zone 12 defined along the front surface 11. The presence of this specular reflection in this location would limit the utility of the diagnostic ophthalmic lens 10 to produce useful retinal imagery in this region of its field-of-view (FOV) due to its tendency to saturate the scene in this location.

Figure 3:
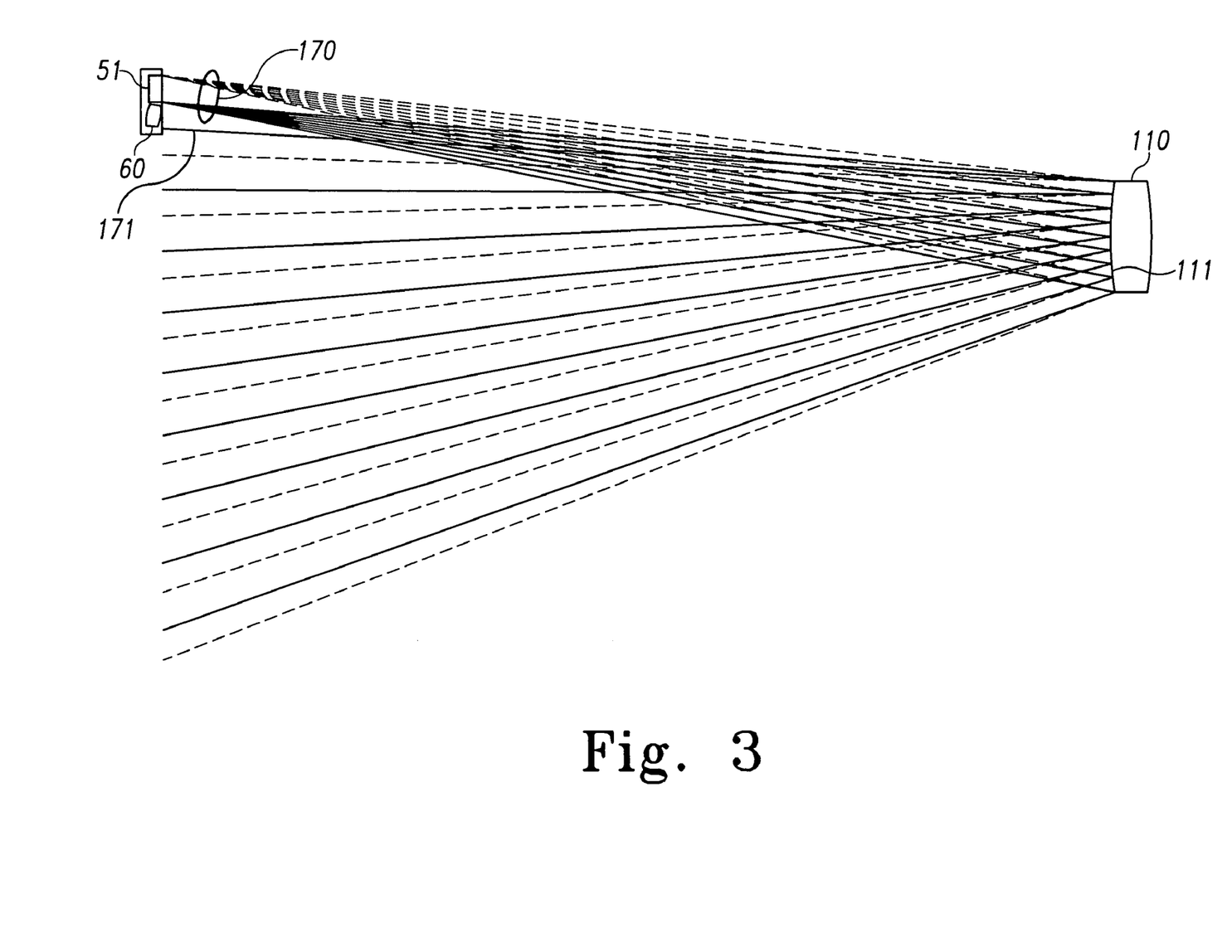
FIGS. 3 and 5 depict the use of an exemplary lens system according to one embodiment of the present invention in place of the prior art lens system of FIG. 1.

In contrast to this, FIG. 3 shows the same opto-mechanical arrangement using a diagnostic ophthalmic lens 110 according to an embodiment of the present invention. The front surface 111 of lens 110 has been flattened to a radius of 125 mm, as the glass has an index-of-refraction of 1.8 instead of 1.5. As seen in FIG. 3, the reflected cone of rays all return in the direction of the ophthalmoscope but none enter the objective 60. This is indicated by the fact that the ray of maximum extent 171 arrives well below the entrance to the objective 60. Thus, the use of a high index-of-refraction optical material facilitates the management of specular surface reflections and thereby allows for an overall improved device.

Figure 4:
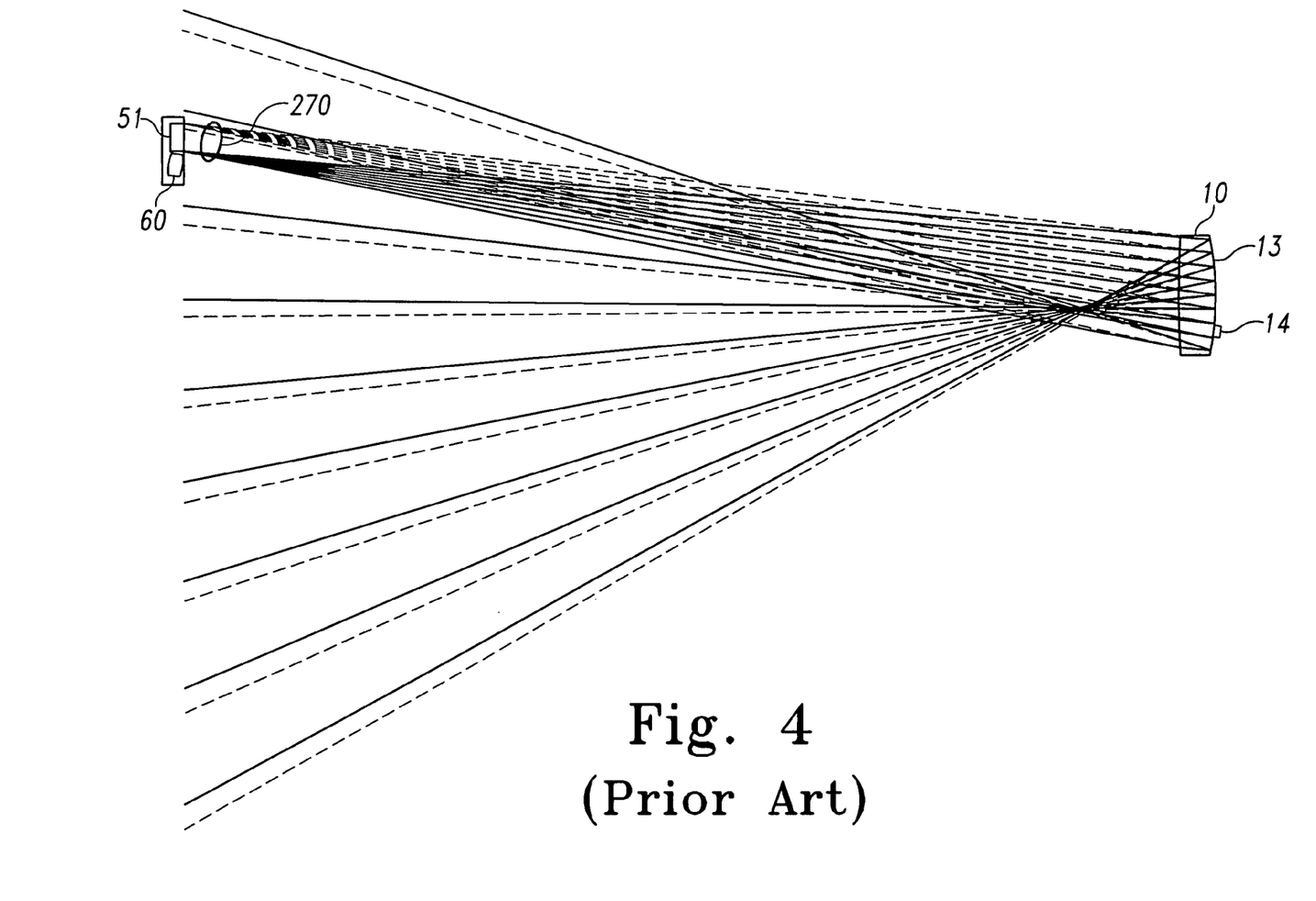
Figure 5:
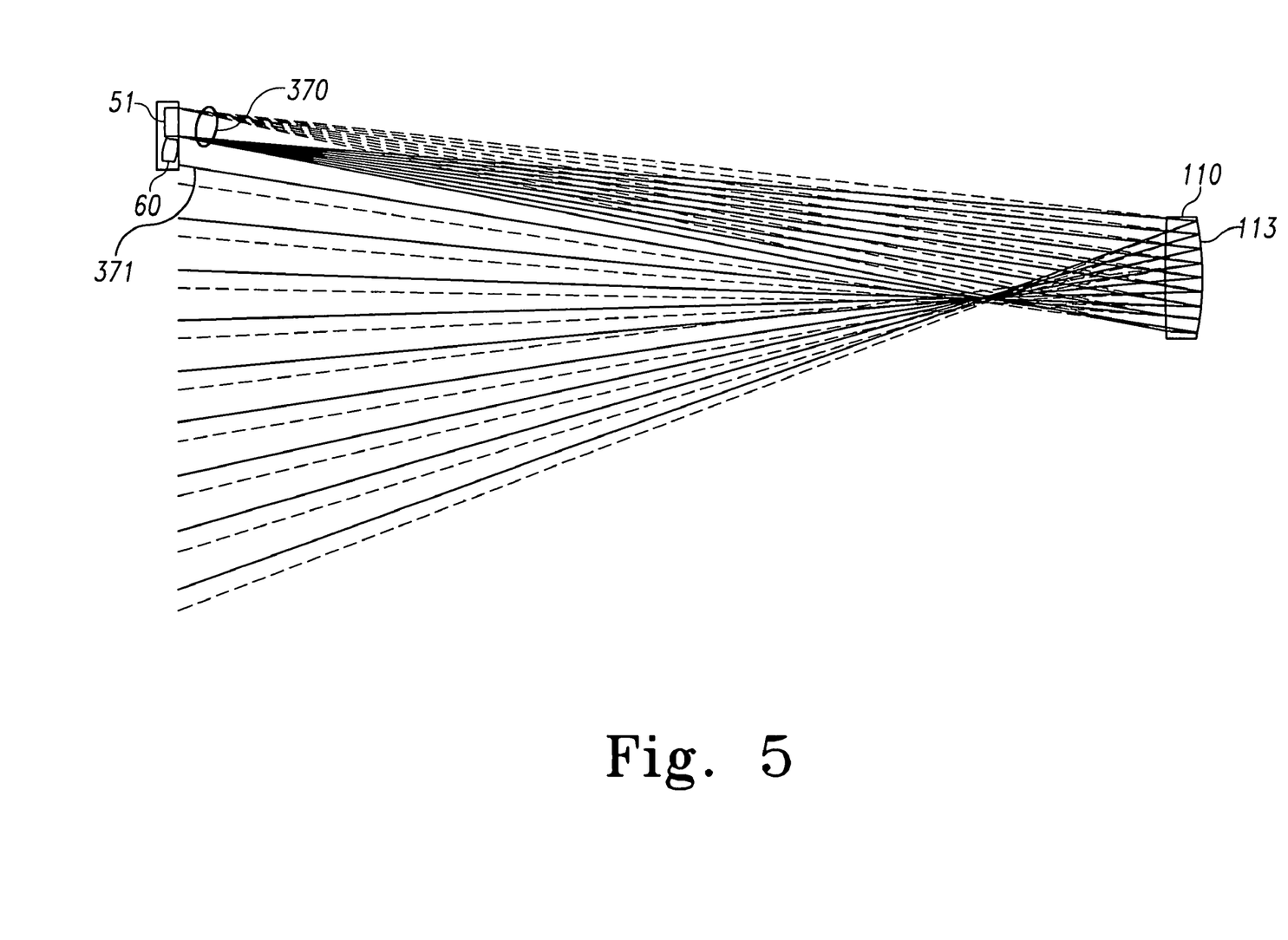

FIG. 5 shows a similar advantageous effect occurring on the rear surface of the diagnostic ophthalmic lens. In FIG. 4, prior art lens 10 includes a rear surface 13 having a radius of curvature of 50 mm. An analysis of this ray trace geometry shows a specular zone 14 forming on the rear surface 13. In FIG. 5 depicting a lens 110 according to one embodiment of the present invention, the radius of curvature of the rear surface 113 is modified to 80 mm as it would be altered when using 1.8 index glass. In this case, the operation of the diagnostic ophthalmic lens 110 is without deleterious specular reflections from the rear surface 113.

Diagnostic ophthalmic lens systems of the present invention generally comprise a single lens element having an optical power of between about 10 and about 40 diopters. In some embodiments, the lens element may have a diameter between about 0.5 and about 3 inches. The lens element is biconvex, and is made from an autoclavable, homogenous glass composition having an index-of-refraction of 1.7 or greater. The front and rear surfaces of the lens element may each be aspheric or spherical. In other words, both surfaces may be aspheric, both may be spherical, or one may be aspheric and the other spherical. (As used herein, the "rear surface" of the lens element refers to the surface which is positioned closest to the patient's eye during normal use). Image aberrations inherent in the lens may be minimized by providing aspherical front and rear surfaces.

Figure 6:
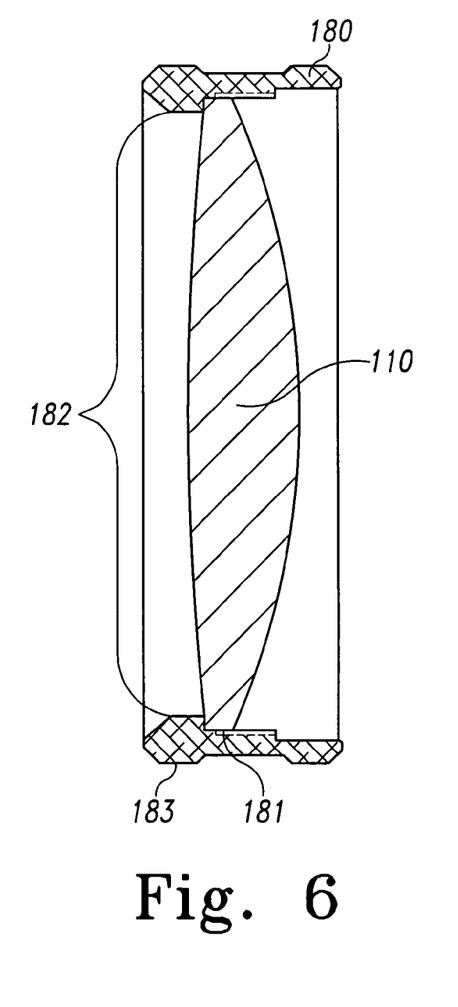
FIG. 6 is a cross-sectional view of an exemplary lens system according to one embodiment of the present invention.

FIG. 6 shows a cross-section of a single-element diagnostic ophthalmic lens system according to one embodiment of the present invention. Lens element 110 is mounted in a housing 180 which holds the lens around its periphery 181. The housing 180 serves to protect the lens element 110 while also allowing an unobstructed optical pathway through its central aperture 182. The housing 180 may also have a tactile surface 183 (e.g., a knurled surface) machined or otherwise provided on at least a portion of its external surface. During normal usage, a doctor may adjust the position and orientation of the single biconvex diagnostic ophthalmic lens 110 by manually grasping the housing 180 and then orienting it into proper relationship with respect to a patient's eye. The tactile surface 183 provides a non-smooth surface which facilitates the doctor obtaining a firm grip on the housing 180 during use of lens. Housing 180 may be made from any of a variety materials, particularly autoclavable materials such as aluminum, stainless steel, titanium, or high-temperature polymer. Lens element 110 may be fixed within housing 180 (e.g., by use of an autoclavable adhesive) or may be removably secured within housing 180, as is known to those skilled in the art.

In addition to the reduction in specular reflections described above, the glass compositions used in the present invention are also autoclavable. Thus, by using such glass compositions, not only is optical performance improved, but the lens system can be sterilized by autoclaving.

Historically, glass compositions used to fabricate optical elements such as lenses were primarily mixtures of various compounds of semi-metals. Examples of typical glass forming compounds include $SiO_2$, $B_2O_3$, $As_2O_3$, and $GeO_2$. Various mixtures of these base compounds have been used to create a variety of distinct optical glass types, each with slightly different optical properties such as index-of-refraction, dispersion, and optical transmission. For the most part, the deviations in index-of-refraction were minor with the average index somewhere around 1.5.

Glass compositions that are primarily composed of semi-metal compounds have been shown to deteriorate rapidly when exposed to the harsh environment of a steam autoclave. In particular, compounds of semi-metals are prone to dissolving out of the polished lens substrate when the lens is exposed to the high temperature and pressure environment of a steam autoclave. During autoclaving, the semi-metal compounds dissolve out of the glass causing corrosion on the surface of the polished glass surface. These surface impurities accumulate over time and work to reduce the ability of the lens to transmit or focus light. Thus, conventional glass compositions often are not autoclavable.

In order to achieve higher indices-of-refraction, some of the semi-metal compounds contained in conventional glass formulations are typically replaced with a variety of other compounds. Some of the compounds added to achieve high index, optically clear, and readily workable optical glasses include, but are not limited to: $LaO_3$, $Gd_2O_3$, $Ta_2O_5$, $Y_2O_3$, $WO_3$, $TiO_2$, $ZnO_2$, $Nb_2O_5$, $Al_2O_3$, $ZnO$, $BaO$, $Sb_2O_3$, $CaO$, $Na_2O$, $Yb_2O_3$, $SnO_2$, $ZrO_2$ and $K_2O$.

In general, the steps taken to increase the index-of-refraction of optical glasses (i.e., replacing some of the semi-metal compounds with other oxides) tend to provide the additional beneficial effect of making the glass more compatible with steam autoclave sterilization. However, testing has shown that not all high index-of-refraction ($\geq 1.7$) glasses are equal in terms of autoclavability. In particular, oxides of alkali metals (e.g., $K_2O$, $Na_2O$) and oxides of alkaline earth metals (e.g., $BaO$, $CaO$) tend to readily dissolve out of the solid glass. Once dissolved out, these compounds react quickly and efficiently to form deleterious impurity sites along the surface of the polished lens (which will appear as opaque spots on the surface of the lens).

In contrast, oxides of rare earth elements (e.g., $La_2O_3$, $Gd_2O_3$, $Yb_2O_3$) tend not to dissolve out under the conditions of a steam autoclave. As such, glass compositions incorporating oxides of rare earth elements are more stable and compatible with autoclaving. Furthermore, oxides other than rare earth metal oxides, alkali metal oxides, and alkaline earth metal oxides (e.g., $Y_2O_3$, $WO_3$, $TiO_2$, $ZnO_2$, $Nb_2O_5$, $Al_2O_3$, ZnO, $Sb_2O_3$, $SnO_2$, $ZrO_2$ and $Ta_2O_5$) have properties that make them intermediate performers in regard to autoclavability (i.e., they show some reduced tendency to dissolve out when exposed to a high-temp, high pressure steam atmosphere).

In particular, high index-of-refraction ($\geq 1.7$) optical glass compositions meeting the following parameters not only provide the desired optical properties but are also autoclavable:

% $SiO_2$ (by weight)+% $B_2O_3$ is less than 50% of the total weight of the composition;

the sum of the % of alkali metal compounds and the % of alkaline earth metal compounds is less than 10% of the total weight of the composition; and (% $SiO_2$+% $B_2O_3$)/(% rare earth compounds) is less than 1

In yet another embodiment, the lens system of the present invention may comprise a biconvex lens element formed from a glass composition having an index-of-refraction greater than 1.8, wherein:

% $SiO_2$ (by weight)+% $B_2O_3$ is less than 30% of the total weight of the composition;

the sum of the % of alkali metal compounds and the % of alkaline earth metal compounds is less than 5% of the total weight of the composition (or even less than 1%); and (% $SiO_2$+% $B_2O_3$)/(% rare earth compounds) is less than 0.7.

By way of example, three commercially-available glass compositions which may used to fabricate autoclavable lens elements according to the present invention are provided in the table below. Testing of these glass compositions has confirmed their autoclavability. Although the exact compositions are not provided by the manufacturer, the below table includes compositional information provided by the manufacturer for each composition.

|  | Hikari E-LASF08 | Ohara S-LAH58 |
|---|---|---|
| Index-of-refraction | 1.88 | 1.88 |
| Composition: | | |
| $SiO_2$ | <10% | 3-8% |
| $B_2O_3$ | 10-20% | 5-15% |
| $La_2O_3$ | 40-50% | 25-35% |
| $Gd_2O_3$ | 10-20% | 25-35% |
| $Ta_2O_5$ | 10-20% | 15-25% |
| $Nb_2O_5$ | <10% | <2% |
| $ZrO_2$ | <10% | 3-8% |
| $Sb_2O_3$ | <1% | <0.5% |
| $SnO_2$ | | <1% |
| BaO | <1% | |
| $WO_3$ | <1% | |
| $Yb_2O_3$ | <10% | |
| CaO | | |
| $Y_2O_3$ | | |
| ZnO | | |

Hikari E-LASF08 is available from Hikari Glass USA, Inc., and Ohara S-LAH58 is available from Ohara, Inc. Both of these materials have been experimentally shown to be compatible with autoclave sterilization. The level of acceptable performance that has been experimentally determined can also be predicted by applying the three compositional rules that are listed once again below to these two glass types:

% $SiO_2$ (by weight)+% $B_2O_3$ is less than 50% of the total weight of the composition;

the sum of the % of alkali metal compounds and the % of alkaline earth metal compounds is less than 10% of the total weight of the composition; and (% $SiO_2$+% $B_2O_3$)/(% rare earth compounds) is less than 1

For both of these 2 glass types, the compositional information that is supplied by the manufacturer results in compositional metrics that predict acceptable autoclave performance.

The specific illustrations and embodiments described herein are exemplary only in nature and are not intended to be limiting of the invention defined by the claims. Further embodiments and examples will be apparent to one of ordinary skill in the art in view of this specification and are within the scope of the claimed invention.

What is claimed is:

1. A lens system comprising a biconvex lens element and a housing in which said biconvex lens element is mounted, wherein:

said biconvex lens element comprises front and rear surfaces;

said front surface of said biconvex lens element comprises a radius of curvature of 125 mm or said rear surface of said biconvex lens element comprises a radius of curvature of 80 mm;

said biconvex lens element comprises a diameter between about 0.5 inches to about 3.0 inches;

said biconvex lens element is fabricated from a glass composition having an index-of-refraction of about 1.7 or greater;

said glass composition comprises $SiO_2$ and $B_2O_3$;

a combined weight % of $SiO_2$ and $B_2O_3$ in said glass composition is less than 50%;

a combined weight % of alkali metal compounds and alkaline earth metal compounds in said glass composition is less than 10%;

a ratio of said combined weight % of $SiO_2$ and $B_2O_3$ over a weight % of rare earth compounds in said glass composition is less than 1;

said biconvex lens element is configured to display an inverted and magnified indirect image of a retinal surface of an eye of a patient in a region external to the eye; and said lens system is configured such that the optical power of said lens element is between about 10 and about 40 diopters.

2. The lens system of claim 1, wherein said glass composition has an index-of-refraction greater than 1.8, said glass composition comprising:

% $SiO_2$ (by weight)+% $B_2O_3$ is less than 30% of the total weight of the composition;

the sum of the % of alkali metal compounds and the % of alkaline earth metal compounds is less than 5% of the total weight of the composition; and (% $SiO_2$+% $B_2O_3$)/(% rare earth compounds) is less than 0.7.

3. The lens system of claim 2, wherein said glass composition comprises:

| $SiO_2$ | <10% |
|---|---|
| $B_2O_3$ | 10-20% |
| $La_2O_3$ | 40-50% |
| $Gd_2O_3$ | 10-20% |
| $Ta_2O_5$ | 10-20% |
| $Nb_2O_5$ | <10% |
| $ZrO_2$ | <10% |
| $Sb_2O_3$ | <1% |

-continued

|  |  |
|---|---|
| BaO | <1% |
| WO$_3$ | <1% |
| Yb$_2$O$_3$ | <10%. |

4. The lens system of claim 3, wherein said lens system includes a single lens element.

5. The lens system of claim 2, wherein said glass composition comprises:

|  |  |
|---|---|
| SiO$_2$ | 3-8% |
| B$_2$O$_3$ | 5-15% |
| La$_2$O$_3$ | 25-35% |
| Gd$_2$O$_3$ | 25-35% |
| Ta$_2$O$_5$ | 15-25% |
| Nb$_2$O$_5$ | <2% |
| ZrO$_2$ | 3-8% |
| Sb$_2$O$_3$ | <0.5% |
| SnO$_2$ | <1%. |

6. The lens system of claim 5, wherein said lens system includes a single lens element.

7. The lens system of claim 2, wherein said lens system includes a single lens element.

8. A lens system comprising a biconvex lens element and a housing in which said biconvex lens element is mounted, wherein:

said biconvex lens element comprises front and rear surfaces;

said biconvex lens element is fabricated from a glass composition having an index-of-refraction greater than 1.8, said glass composition comprising:

|  |  |
|---|---|
| SiO$_2$ | 3-8% |
| B$_2$O$_3$ | 5-15% |
| La$_2$O$_3$ | 25-35% |
| Gd$_2$O$_3$ | 25-35% |
| Ta$_2$O$_5$ | 15-25% |

-continued

|  |  |
|---|---|
| Nb$_2$O$_5$ | <2% |
| ZrO$_2$ | 3-8% |
| Sb$_2$O$_3$ | <0.5% |
| SnO$_2$ | <1%; | said biconvex lens element is configured to display an inverted and magnified indirect image of a retinal surface of an eye of a patient in a region external to the eye; and said lens system is configured such that the optical power of said lens element is between about 10 and about 40 diopters.

9. The lens system of claim 8, wherein said front and rear surfaces are aspheric.

10. The lens system of claim 8, wherein said front and rear surfaces are spherical.

11. The lens system of claim 8, wherein one of said front and rear surfaces is aspheric and the other surface is spherical.

12. The lens system of claim 8, wherein said front surface of said biconvex lens element comprises a radius of curvature of 125 mm.

13. The lens system of claim 8, wherein said rear surface of said biconvex lens element comprises a radius of curvature of 80 mm.

14. The lens system of claim 8, wherein said housing includes a tactile surface on at least a portion of its exterior.

15. The lens system of claim 14, wherein said tactile surface comprises a knurled surface.

16. The lens system of claim 8, wherein the biconvex lens element is a single lens element having front and rear spherical surfaces comprising radii of curvature of 125 mm and 80 mm respectively.

17. The lens system of claim 8, wherein said lens system includes a single lens element.

18. The lens system of claim 8, wherein said biconvex lens element comprises a diameter between about 0.5 inches to about 3.0 inches.

* * * * *